Sept. 1, 1964 A. W. SCRIBNER 3,146,886
METAL EXTRUSION DIE BLOCK AND RAM
Filed Nov. 1, 1961

Albert W. Scribner

United States Patent Office 3,146,886
Patented Sept. 1, 1964

3,146,886
METAL EXTRUSION DIE BLOCK AND RAM
Albert W. Scribner, West Hartford, Conn.
(6 Country Club Road, Darien, Conn.)
Filed Nov. 1, 1961, Ser. No. 149,300
3 Claims. (Cl. 207—18)

This invention relates to a novel method and apparatus for die expressing metal, and more particularly relates to an improved method and apparatus for extruding metal whereby relatively intricatel yshaped products may be formed by simple type tooling.

One object of the invention is to provide a novel method and apparatus for laterally extruding a work billet so that substantially no reduction in the maximum width of the billet occurs during the extrusion operation.

Another object of the invention is to provide a novel method and apparatus for extruding metal whereby the extrusion ram forms a movable side portion of the extrusion orifice.

Another object of the invention is to provide a novel method and apparatus for extruding metal whereby varying ram cross sectional profiles and/or work blanks may be used to produce varying product shapes.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
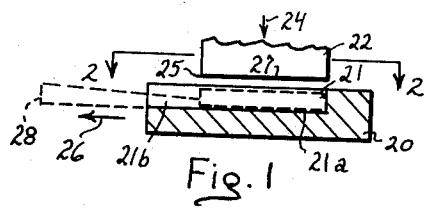
FIGURE 1 is a side elevational view in partial section showing a ram and an associated extrusion die block.
Figure 2:
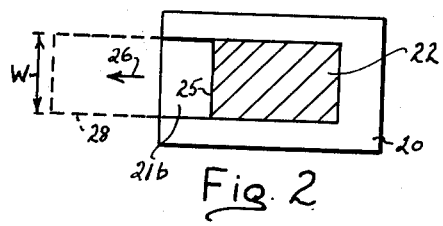
FIGURE 2 is a sectional plan view taken along section line 2—2 of FIGURE 1.

Referring to FIGURES 1 and 2 there is shown a die block 20 having a rectangular open sided work blank receiving a recess 21 formed therein. Recess 21 has a blank receiving portion 21a and a throat portion 21b. A rectangular cross sectioned ram 22 is mounted for cooperation with said die block so as to slidably engage the three vertical side walls of said recess 21. After a rectangular work blank 23 has been inserted in the die block recess 21 the ram 22 is forced downwardly as indicated by arrow 24 so as to laterally extrude the work metal out through the rectangular shaped extrusion orifice defined by the moving lower left edge 25 of the ram and the bottom and two adjacent side walls of the open sided throat portion of recess 21 in said die block. As the work metal is thus extruded to the left 26 the effective extrusion orifice gets smaller so that a progressive taper is imparted to the extruded product 27, as illustrated in FIGURE 1. Contouring the lower face 27 of ram 22 as well as the ram edge 25 may be utilized to further vary the shape of the extruded product 28.

Figure 3:
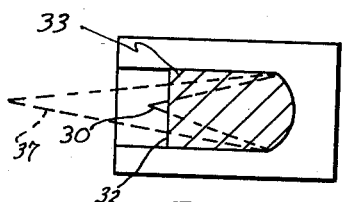
FIGURES 3 and 4 are plan views of two modifications of the FIGURE 1 apparatus.
Figure 4:
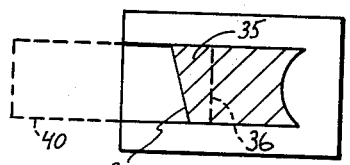

In FIGURES 1 and 2 the ram and work blank have substantially the same sectional profile, however in FIGURE 3 a portion 30 of the work blank extends laterally beyond the lower left edge 32 of the associated ram 33; while in FIGURE 4 the contoured lower left edge 34 of ram 35 extends laterally to the left beyond the left edge 36 of the flat contoured work blank. Here the extruded products 37 and 40 of FIGURES 3 and 4 will vary in shape in accordance with the relative corresponding sectional profiles of the respective rams and work blanks.

Figure 5:
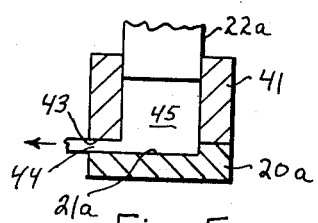
FIGURE 5 is an axial sectional view of another embodiment of the invention.

The apparatus of FIGURE 5 is similar to that of FIGURE 1 except that a container 41 is secured to the die block. Here the lower left end of container 43 cooperates with the walls of the open sided notch 21 of die block 20 so as to define a fixed shape extrusion orifice 44 so that when the ram 22 is forced downwardly the work billet 45 is progressively laterally forced through the said perpendicularly oriented die orifice 44.

In each of the devices of FIGURES 1–5 the overall or maximum width, such as W, FIGURE 2, of the work blank and the extruded product remain substantially the same; thus the extrusion flow is in one general lateral direction 26. By using the apparatus of FIGURES 1–5 various odd shaped extruded products may be formed having varying cross sections.

Although the invention has been particularly shown and described, it is contemplated that various changes and modifications can be made without departing from the spirit and scope thereof as defined in the claims.

I claim:

1. In an extrusion press; a die block, said die block being formed with a recess open at its upper end and defined by a bottom wall and at least three cooperating side walls, one lateral side of said recess being open, and a ram movably mounted for cooperation with said recess, said ram having a cross sectional profile corresponding to that for said open upper end of said recess, the cross sectional shape of said ram being different from the corresponding sectional shape of the work blank used, one leading edge of said ram cooperating with said laterally open side of said recess to thereby form an extrusion orifice, the advancing movement of said ram thereby causing said extrusion orifice to decrease in size.

2. Apparatus as defined by claim 1 wherein at least a portion of the side of the ram perimeter adjacent said open side of said recess is disposed at an acute angle with respect to the direction of extrusion so as to further shape the tapered extrusion formed during the working stroke of said ram.

3. In an extrusion press:
a die block;
said die block having a work blank receiving recess formed in the top portion thereof;
said die block recess being defined by a bottom surface and by cooperating side walls;
the top and at least one side of said recess being open, the width of this lateral opening at one side of said recess being substantially the same as the width of said recess; and
an extrusion ram movable through the top of said recess and towards and away from said bottom surface, the bottom of said ram cooperating with said bottom surface and the side walls of said recess so as to form an open sided extrusion chamber;
the lower edge of said ram at said open side of said extrusion chamber in cooperation with the adjacent portions of said bottom surface and side walls of said recess defining a variable extrusion orifice that decreases in size by reason of the advancing movement of said lower edge of said ram thus enabling a tapered extrusion to be produced by the working stroke of said ram; at least a portion of the side of the ram perimeter adjacent said open side of said recess being disposed at an acute angle with respect to the direction of extrusion so as to further shape the tapered extrusion formed during the said working stroke of said ram.

References Cited in the file of this patent

UNITED STATES PATENTS

| | | |
|---|---|---|
| 2,193,891 | Talbot-Crosbie et al. | Mar. 19, 1940 |
| 2,200,231 | Kafowi | May 7, 1940 |
| 2,387,532 | Schenk | Oct. 23, 1945 |
| 2,539,564 | Barrett | Jan. 30, 1951 |
| 2,630,916 | Blair | Mar. 10, 1953 |
| 2,639,809 | Perry et al. | May 26, 1953 |
| 2,639,810 | Doan | May 26, 1953 |
| 2,699,252 | Remington et al. | Jan. 11, 1955 |
| 2,714,450 | Chestnut | Aug. 2, 1955 |
| 2,973,092 | Graham | Feb. 28, 1961 |
| 2,974,790 | Murphy et al. | Mar. 14, 1961 |
| 2,975,893 | Johnson | Mar. 21, 1961 |
| 3,013,657 | Altwicker | Dec. 19, 1961 |

FOREIGN PATENTS

| | | |
|---|---|---|
| 887,235 | France | Aug. 2, 1943 |